(12) United States Patent
Kuo

(10) Patent No.: US 8,896,224 B2
(45) Date of Patent: Nov. 25, 2014

(54) DRIVER CIRCUIT FOR ELECTROLUMINESCENT ELEMENT

(71) Applicant: Shenzhen China Star Optoelectronics Technology Co., Ltd., Shenzhen, Guangdong (CN)

(72) Inventor: Ping-Sheng Kuo, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 0 days.

(21) Appl. No.: 13/992,718

(22) PCT Filed: Apr. 23, 2013

(86) PCT No.: PCT/CN2013/074553
§ 371 (c)(1),
(2), (4) Date: Jun. 8, 2013

(65) Prior Publication Data
US 2014/0312801 A1 Oct. 23, 2014

(51) Int. Cl.
*H05B 33/08* (2006.01)
(52) U.S. Cl.
CPC ..................................... *H05B 33/08* (2013.01)
USPC ........................................... 315/210; 315/152

(58) Field of Classification Search
CPC ... H03H 7/40; H03H 2001/0057; H02J 5/005; H02J 17/00; H02J 7/025; H02J 7/35; H02J 7/045; H02J 2007/0062; H02J 3/32; H02J 3/383; H02J 7/0027; H02J 7/0029
See application file for complete search history.

(56) References Cited

U.S. PATENT DOCUMENTS

| | | | |
|---|---|---|---|
| 7,394,209 B2 * | 7/2008 | Lin et al. | 315/247 |
| 8,456,092 B2 * | 6/2013 | Knapp | 315/152 |
| 8,471,496 B2 * | 6/2013 | Knapp | 315/307 |
| 2011/0062874 A1 * | 3/2011 | Knapp | 315/158 |
| 2012/0235566 A1 * | 9/2012 | Karalis et al. | 315/70 |
| 2013/0154498 A1 * | 6/2013 | Missbach | 315/210 |

* cited by examiner

*Primary Examiner* — Crystal L Hammond
(74) *Attorney, Agent, or Firm* — Andrew C. Cheng

(57) ABSTRACT

A driver circuit for an EL element is proposed. The driver circuit for the EL element includes a first TFT, a second TFT, a third TFT, a storage capacitor, and an EL element. The EL element includes an anode connected to a first supply voltage and a cathode connected to a source of the first TFT. A source of the second TFT is connected to a drain of the first TFT. A source of the third TFT is connected to a drain of the second TFT. A drain of the third TFT is connected to the ground. Brightness of the EL element can be prevented from being lowered due to EL element degradation by adopting the method of such connections.

12 Claims, 2 Drawing Sheets

DRIVER CIRCUIT FOR ELECTROLUMINESCENT ELEMENT

BACKGROUND OF THE INVENTION

1. Field of the Invention

The present invention relates to display technology, and more particularly, to a driver circuit for an electroluminescent (EL) element.

2. Description of the Prior Art

Electroluminescent displays (ELDs) grab people's attention because the ELDs have many advantages such as wide viewing angles, quick response, excellent color gamut, etc. So the ELDs are gradually accepted and used in products, especially in cellphones, media players, small introductory TV sets.

The ELDs should be equipped with a driver circuit for driving an EL element to illuminate. Please refer to FIG. 1 showing a schematic diagram of a driver circuit for an EL element in the conventional technology. The conventional driver circuit for the EL element includes a switch thin-film transistor (TFT) T1', a driver TFT T2', a storage capacitor C', and an EL element D'. The driver circuit for the EL element is realized in that an electric signal is charged and stored in the storage capacitor C' at the sampling phase. The electric signal is in a relation with the brightness of the EL element D'. The electric signal stored in the storage capacitor C' ensures that the EL element D' keeps shining at the holding phase. However, the conventional EL element D' may have a degradation in operation, resulting in variations of the resistance of the EL element D'. The brightness of the EL element D' is thus greatly affected by the degradation of the EL element D'. As a result, the ELDs do not have good display effects.

Therefore, a driver circuit for an EL element has to be provided for solving the above-mentioned problem.

SUMMARY OF THE INVENTION

A driver circuit for an EL element is proposed in the present invention for avoiding the negative effects on the brightness of the EL element due to EL element degradation.

According to the present invention, a driver circuit for an electroluminescent (EL) element comprises a first thin-film transistor (TFT), a second TFT, a third TFT, a fourth TFT, a fifth TFT, a sixth TFT, a storage capacitor, and an EL element. The second TFT comprises a source connected to a drain of the first TFT. The third TFT comprises a source connected to a drain of the second TFT and a drain connected to the ground. The storage capacitor comprises a first terminal connected to a gate of the second TFT and a second terminal connected to the drain of the second TFT. The fourth TFT comprises a source connected to a second supply voltage and a drain connected to the source of the second TFT. The fifth TFT comprises a source connected to the drain of the fourth TFT and a drain connected to the gate of the second TFT. The sixth TFT comprises a source connected to the drain of the second TFT and a drain connected to a data signal. The EL element comprises an anode connected to a first supply voltage and a cathode connected to a source of the first TFT. A duty cycle of the driver circuit for the EL element comprises a sampling phase and a holding phase, the first TFT, the second TFT, and the third TFT are conducted at the holding phase, an impedance of the first TFT, the second TFT, and the third TFT in cascode is greater than an impedance of the EL element. The fourth transistor, the fifth transistor, and the sixth transistor are cut-off in the holding phase. The second transistor, the fourth transistor, the fifth transistor, and the sixth transistor are conducted at the sampling phase, while the first transistor and the third transistor are cut-off at the sampling phase. The storage capacitor is used for storing an electric signal across the gate of the second TFT and the drain of the second TFT at the sampling stage and for holding a voltage which is between the gate of the second TFT and the drain of the second TFT and varies with the electric signal at the holding phase for controlling brightness of the EL element.

In one aspect of the present invention, gates of the fourth TFT, the fifth TFT, and the sixth TFT are all connected to a first gate signal, gates of the first TFT and the third TFT are both connected to a second gate signal, which is the reversed-phase first gate signal, and the first gate signal and the second gate signal are used for controlling the fourth TFT, the fifth TFT, and the sixth TFT to be cut-off at the holding phase and for controlling the first TFT, the second TFT, and the third TFT to be conducted at the holding phase.

According to the present invention, a driver circuit for an electroluminescent (EL) element comprises a first thin-film transistor (TFT), a second TFT, a third TFT, a storage capacitor, and an EL element. The second TFT comprises a source connected to a drain of the first TFT. The third TFT comprises a source connected to a drain of the second TFT and a drain connected to the ground. The storage capacitor comprises a first terminal connected to a gate of the second TFT and a second terminal connected to the drain of the second TFT. The EL element comprises an anode connected to a first supply voltage and a cathode connected to a source of the first TFT. A duty cycle of the driver circuit for the EL element comprises a sampling phase and a holding phase. The first TFT, the second TFT, and the third TFT are conducted at the holding phase. The storage capacitor is used for storing an electric signal between the gate of the second TFT and the drain of the second TFT at the sampling stage and for holding a voltage which is between the gate of the second TFT and the drain of the second TFT and varies with the electric signal at the holding phase for controlling brightness of the EL element.

In one aspect of the present invention, the driver circuit for the EL element further comprises a fourth TFT, a fifth transistor, and a sixth transistor. The fourth TFT comprises a source connected to a second supply voltage and a drain connected to the source of the second TFT. The fifth TFT comprises a source connected to the drain of the fourth TFT and a drain connected to the gate of the second TFT. The sixth TFT comprises a source connected to the drain of the second TFT and a drain connected to a data signal. The second TFT, the fourth TFT, the fifth TFT, and the sixth TFT are conducted at the sampling phase, and the first TFT and the third TFT are cut-off at the holding phase.

In another aspect of the present invention, gates of the fourth TFT, the fifth TFT, and the sixth TFT are all connected to a first gate signal. Gates of the first TFT and the third TFT are both connected to a second gate signal, which is the reversed-phase first gate signal, and the first gate signal and the second gate signal are used for controlling the fourth TFT, the fifth TFT, and the sixth TFT to be cut-off at the holding phase and for controlling the first TFT, the second TFT, and the third TFT to be conducted at the holding phase.

In another aspect of the present invention, an voltage level of the first gate signal at the sampling phase is reverse to an voltage level of the first gate signal at the holding phase. The first gate signal and the second gate signal are also used for controlling the first TFT and the third TFT to be cut-off at the sampling phase and for controlling the second TFT, the fourth TFT, the fifth TFT, and the sixth TFT to be conducted at the sampling phase.

In another aspect of the present invention, the first TFT, the second TFT the third TFT, the fourth TFT, the fifth TFT, and the sixth TFT are all N-type IGZO (indium gallium zinc oxide) TFTs. The first gate signal is at a high voltage level at the sampling phase and at a low voltage level at the holding phase.

In another aspect of the present invention, duration at the holding phase is longer than duration at the sampling phase when the driver circuit for the EL element is during a duty cycle.

In another aspect of the present invention, the EL element is an organic EL element.

In another aspect of the present invention, the first TFT, the second TFT the third TFT, the fourth TFT, the fifth TFT and the sixth TFT are all N-type IGZO TFTs.

In still another aspect of the present invention, the sixth TFT is a current source at the sampling phase equivalently.

In yet another aspect of the present invention, a current flowing through the current source is determined by both of the data signal and the first gate signal.

Differing from the conventional technology, a plurality of TFTs are cascode-connected for forming a driver circuit for the EL element working at the passage at the holding phase in the present invention. The driver circuit for the EL element can avoid the brightness of the EL element from being affected due to the EL element degradation. An in-cell current source of a pixel is equipped for compensating uniformity and reliability of a threshold voltage and electron mobility of the TFTs and an IR drop of the dc supply voltage at lower costs. These are the merits of the present invention.

DETAILED DESCRIPTION OF THE PREFERRED EMBODIMENTS

The invention is illustrated in detail in consideration of the following detailed description of various embodiments of the disclosure in connection with the accompanying drawings.

Figure 1:
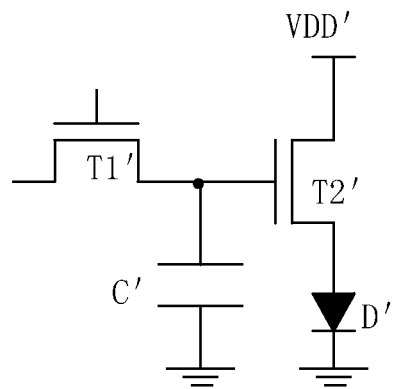
FIG. 1 shows a schematic diagram of a conventional driver circuit for an EL element.
Figure 2:
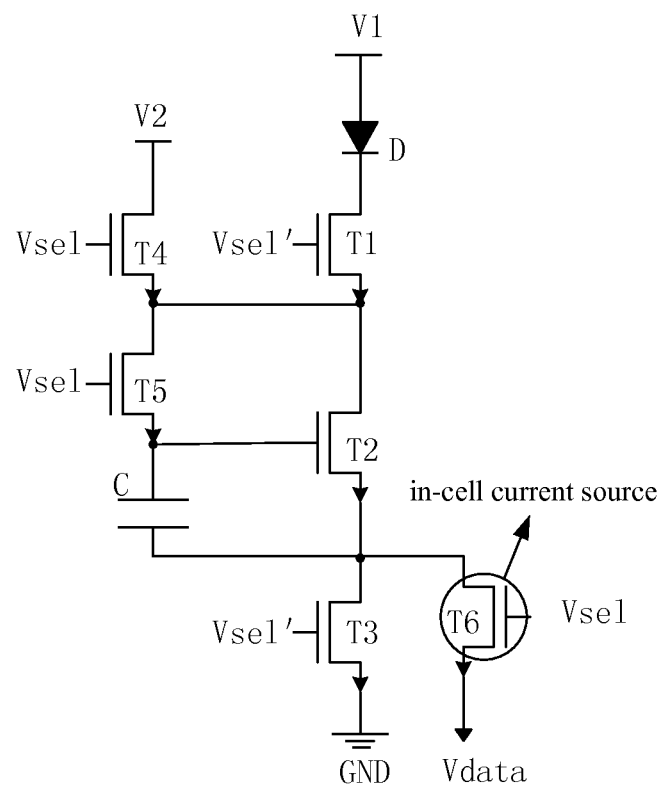
FIG. 2 shows a schematic diagram of a driver circuit for an EL element according to a preferred embodiment of the present invention.

Please refer to FIG. 2 showing a schematic diagram of a driver circuit for an EL element according to a preferred embodiment of the present invention. The driver circuit for the EL element comprises a first TFT T1, a second TFT T2, a third TFT T3, a fourth TFT T4, a fifth TFT T5, a sixth TFT T6, an EL element D, and a storage capacitor C. The first TFT T1, the second TFT T2, the third TFT T3, the fourth TFT T4, the fifth TFT T5, and the sixth TFT T6 are all N-type IGZO (indium gallium zinc oxide) TFTs in the present invention. In other embodiments, the first TFT T1, the second TFT T2, the third TFT T3, the fourth TFT T4, the fifth TFT T5, and the sixth TFT T6 are another kind of TFT. The EL element D is preferably an OLED (organic light-emitting diode) in the present invention. In other embodiments, the EL element D is another kind of element.

The EL element DI comprises an anode connected to a first supply voltage V1 and a cathode connected to a source of the first TFT T1. A source of the second TFT T2 is connected to a drain of the first TFT T1. A source of the third TFT 13 is connected to a drain of the second TFT T2. A drain of the third TFT 13 is connected to the ground. The storage capacitor C comprises a first terminal and a second terminal. The first terminal is connected to a gate of the second TFT T2, and the second terminal is connected to the drain of the second TFT T2. A source of the fourth TFT T4 is connected to a second supply voltage V2. The source of the second TFT T2 is connected to a drain of the fourth TFT T4. A source of the sixth TFT' T6 is connected to the drain of the second TFT T2. A drain of the sixth TFT T6 is connected to a data signal Vdata. A source of the fifth TFT T5 is connected to the drain of the fourth TFT T4. The gate of the second TFT T2 is connected to a drain of the fifth TFT T5. The gates of the fourth TFT T4, the fifth TFT T5, and the sixth TFT T6 are all connected to a first gate signal Vsel. The gates of the first TFT T1 and the third TFT T3 are both connected to a second gate signal Vsel', which is the reversed-phase first gate signal Vsel.

The duty cycle of the driver circuit for the EL element comprises a sampling phase and a holding phase. When the driver circuit for the EL element is during a duty cycle, the duration at the holding phase is longer than the duration at the sampling phase. The storage capacitor C is used for storing the electric signal between the gate of the second TFT T2 and the drain of the second TFT T2 at the sampling phase and for holding the voltage which is between the gate of the second TFT T2 and the drain of the second TFT T2 and varies with the electric signal at the holding phase. In this way, the brightness of the EL element D can be controlled. The voltage level of the first gate signal Vsel at the sampling phase is reverse to that of the first gate signal Vsel at the holding phase. The first gate signal Vsel is at a high voltage level at the sampling phase and at a low voltage level at the holding phase in the present embodiment. The first gate signal Vsel can be at a low voltage level at the sampling phase while can be at a high voltage level at the holding phase correspondingly in another embodiment.

Below in conjunction with the accompanying drawings, the working principle of the driver circuit for the EL element will be described in further detail.

When the first gate signal Vsel is at the high voltage level, the second gate signal Vsel' is at the low voltage level. At this time, the first TFT T1 and the third TFT 13 are cut-off, and the second TFT T2, the fourth TFT T4, the fifth TFT T5, and the sixth TFT T6 are conducted. The driver circuit for the EL element works at the sampling phase. The second TFT T2, the fourth TFT T4, the fifth TFT T5, and the sixth TFT T6 form a passage between the second supply voltage V2 and the data signal Vdata. The storage capacitor C is connected to the gate of the second TFT T2 and to the drain of the second TFT T2 in parallel. The storage capacitor C is between the gate of the second TFT T2 and the drain of the second TFT T2. The storage capacitor C records the electric signal between the gate of the second TFT T2 and the drain of the second TFT T2. In other words, the storage capacitor C records variations of voltage between the gate of the second TFT T2 and the drain of the second TFT T2. When the first gate signal Vsel is at the low voltage level, the second gate signal Vsel' is at the high voltage level. At this time, the fourth TFT T4, the fifth TFT T5, and the sixth TFT T6 are cut-off at the holding phase, and the first TFT T1, the second TFT T2, and the third TFT T3 are conducted at the holding phase. The driver circuit for the EL element works at the holding phase. The first TFT T1, the second TFT T2, the third TFT T3 form a passage between the first supply voltage V1 and the ground GND. The storage capacitor C is connected to the gate of the second TFT T2 and to the drain of the second TFT T2 in parallel. The storage capacitor C is between the gate of the second TFT T2 and the drain of the second TFT T2. The voltage between the gate of the second TFT T2 and the drain of the second TFT T2 varies with the electric signal. In this ways, the brightness of the EL element D is properly controlled.

Figure 3:
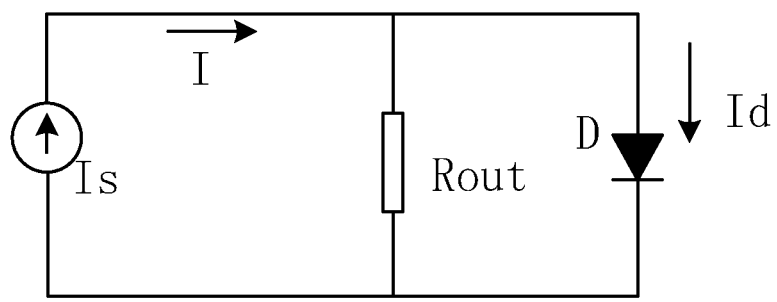
FIG. 3 shows an equivalent circuit diagram (Norton equivalent) of the driver circuit for the EL element at the holding phase according to the embodiment of the present invention.

Please refer to FIG. 3 showing an equivalent circuit diagram of the driver circuit for the EL element at the holding phase according to the embodiment of the present invention. The passage of the driver circuit for the EL element at the holding phase is equivalently the circuit diagram as shown in FIG. 2 according to Norton's theorem where Rout represents an output equivalent impedance after the first TFT T1, the second TFT T2, and the third TFT T3 are cascode-connected. A current source Is and the admittance Rout are connected in parallel. A load port is connected to the EL element D. The current I of the current source Is is the current of the load port with short circuit current. From the structure of the circuit, the EL, element D has the current Id as:

$$Id = I \times \frac{R_{out}}{R_{out} + R_D} \quad (1)$$

where $R_D$ represents the resistor of the EL element D.

Rout represents an equivalent output impedance after the first TFT T1, second TFT T2, and the third TFT T3 are cascode-connected, so Rout>>$R_D$. When the EL element D degrades, that is, $R_D$ changes, the current Id of the EL element D nearly does not change as shown in Formula (1), which implies that the EL element D degradation will not cause instability of illumination of the EL element D.

Further, referring to FIG. 2, the sixth TFT T6 is a current source at the sampling phase equivalently. The current I6 flowing through the current source is determined by both of the data signal Vdata and the first gate signal Vsel. Specifically, the current source is an in-cell current source. In other words, the current source is built in the pixel. The working principle of the in-cell current source of the pixel is as follows: because the sixth TFT T6 reaches saturation at the sampling phase, a formula for the drain current of a field-effect transistor which reaches saturation is:

$$I6 = \frac{1}{2}\mu n Cox \frac{W}{L}(Vsel\text{-}Vdata\text{-}Vth)^2 \quad (2)$$

where $\mu n$ represents electron mobility. Cox represents a gate-insulator capacitor per unit area, W/L represents the width-to-length ratio of the sixth TFT T6, and Vth represents a threshold voltage of the sixth TFT T6.

As mentioned previously, $\mu n$, Cox, W/L, and Vth maintain unchanged on the whole duty cycle of the driver circuit for the EL element, so the current I6 flowing through the in-cell current source of the pixel is determined by both of the data signal Vdata and the first gate signal Vsel, as shown in Formula (2).

Below in conjunction with the embodiment, the function of the in-cell current source of the pixel will be described in further detail.

Take the second TFT T2 for example. Firstly, the degradation of the first TFT T1, the second TFT T2, and the third TFT T3 has to be taken into consideration because the duration at the holding phase is much longer than the duration at the sampling phase. When the second TFT T2 degrades, the threshold voltage of the second TFT T2 increases and/or the electron mobility of the second TFT T2 decreases. The voltage level of the gate of the second TFT 1T2 automatically rises at the sampling phase for keeping the current I2 unchanged. (The current I6 is determined by the data signal Vdata and the first gate signal Vsel. The current I2 flowing through the second TFT T2 is the current I6. Thus, the current I2 will not vary with the degradation of the second TFT T2.) The voltage is stored in the storage capacitor C. At the holding phase, the current Id (Id=I2) of the EL element keeps unchanged. Thus, the in-cell current source of the pixel can compensate uniformity and reliability of the threshold voltage and the electron mobility of the second TFT T2.

The second TFT T2 is used again for explanation. Secondly, the second supply voltage V2 lowers when a supply voltage suffers an IR drop, which causes the voltage between the source of the second TFT T2 and the drain of the second TFT T2 to be lower. At the sampling phase, the voltage level of the gate of the second TFT T2 rises automatically due to I2=I6. The voltage is stored in the storage capacitor C so that the current Id (Id=I2) keeps unchanged at the holding phase. So the in-cell current source of the pixel can compensate an IR drop of the dc supply voltage.

Differing from the conventional technology, the plurality of TFTs are cascode-connected for forming the driver circuit for the EL element working at the passage at the holding phase in the present invention. The driver circuit for the EL element can avoid the brightness of the EL element D from being affected due to the EL element degradation. The in-cell current source of the pixel can compensate uniformity and reliability of the threshold voltage and electron mobility of the TFTs and an IR drop of the dc supply voltage.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A driver circuit for an electroluminescent (EL) element, comprising:
   a first thin-film transistor (TFT);
   a second TFT, comprising a source connected to a drain of the first TFT;
   a third TFT, comprising a source connected to a drain of the second TFT and a drain connected to ground;
   an EL element, comprising an anode and a cathode, the anode connected to a first supply voltage, and the cathode connected to a source of the first TFT;
   a storage capacitor, comprising a first terminal and a second terminal, the first terminal connected to a gate of the second TFT and the second terminal connected to the drain of the second TFT;
   a fourth TFT, comprising a source connected to a second supply voltage and a drain connected to the source of the second TFT;
   a fifth TFT, comprising a source connected to the drain of the fourth TFT and a drain connected to the gate of the second TFT; and
   a sixth TFT, comprising a source connected to the drain of the second TFT and a drain connected to a data signal;
   wherein a duty cycle of the driver circuit for the EL element comprises a sampling phase and a holding phase, the first TFT, the second TFT, and the third TFT are conducted at the holding phase, an impedance of the first TFT, the second TFT, and the third TFT in cascode is greater than an impedance of the EL element, wherein the fourth transistor the fifth transistor, and the sixth transistor are cut-off in the holding phase, wherein the second transistor, the fourth transistor, the fifth transistor, and the sixth transistor are conducted at the sampling phase, while the first transistor and the third transistor are cut-off at the sampling phase, wherein the storage capacitor is used for storing an electric signal across the gate of the second TFT and the drain of the second TFT at the sampling stage and for holding a voltage which is between the gate of the second TFT and the drain of the second TFT and varies with the electric signal at the holding phase for controlling brightness of the EL element.

2. The driver circuit for the EL element as claimed in claim 1, wherein gates of the fourth TFT, the fifth TFT, and the sixth TFT are all connected to a first gate signal, gates of the first TFT and the third TFT are both connected to a second gate signal, which is the reversed-phase first gate signal, and the first gate signal and the second gate signal are used for controlling the fourth TFT, the fifth TFT, and the sixth TFT to be cut-off at the holding phase and for controlling the first 11, the second TFT, and the third TFT to be conducted at the holding phase.

3. A driver circuit for an electroluminescent (EL) element, comprising:
a first thin-film transistor (TFT);
a second TFT, comprising a source connected to a drain of the first TFT;
a third TFT, comprising a source connected to a drain of the second TFT and a drain connected to ground;
an EL element, comprising an anode and a cathode, the anode connected to a first supply voltage, and the cathode connected to a source of the first TFT; and
a storage capacitor, comprising a first terminal and a second terminal, the first terminal connected to a gate of the second TFT, and the second terminal connected to the drain of the second TFT;
wherein a duty cycle of the driver circuit for the EL element comprises a sampling phase and a holding phase, the first TFT, the second TFT, and the third TFT are conducted at the holding phase, and the storage capacitor is used for storing an electric signal between the gate of the second TFT and the drain of the second TFT at the sampling stage and for holding a voltage which is between the gate of the second TFT and the drain of the second TFT and varies with the electric signal at the holding phase for controlling brightness of the EL element.

4. The driver circuit for the EL element as claimed in claim 3, further comprising;
a fourth TFT, comprising a source connected to a second supply voltage and a drain connected to the source of the second TFT;
a fifth TFT, comprising a source connected to the drain of the fourth TFT and a drain connected to the gate of the second TFT; and
a sixth TFT, comprising a source connected to the drain of the second TFT and a drain connected to a data signal;
wherein the second TFT, the fourth TFT, the fifth TFT, and the sixth TFT are conducted at the sampling phase, and the first TFT and the third TFT are cut-off at the holding phase.

5. The driver circuit for the EL element as claimed in claim 4, wherein gates of the fourth TFT, the fifth TFT, and the sixth TFT are all connected to a first gate signal, gates of the first TFT and the third TFT are both connected to a second gate signal, which is the reversed-phase first gate signal, and the first gate signal and the second gate signal are used for controlling the fourth TFT, the fifth TFT and the sixth TFT to be cut-off at the holding phase and for controlling the first TFT, the second TFT, and the third TFT to be conducted at the holding phase.

6. The driver circuit for the EL element as claimed in claim 5, wherein an voltage level of the first gate signal at the sampling phase is reverse to an voltage level of the first gate signal at the holding phase, and the first gate signal and the second gate signal are also used for controlling the first TFT and the third TFT to be cut-off at the sampling phase and for controlling the second TFT, the fourth TFT, the fifth TFT, and the sixth TFT to be conducted at the sampling phase.

7. The driver circuit for the EL element as claimed in claim 6, wherein the first TFT, the second TFT, the third TFT, the fourth TFT, the fifth TFT, and the sixth TFT are all N-type IGZO (indium gallium zinc oxide) TFTs, and the first gate signal is at a high voltage level at the sampling phase and at a low voltage level at the holding phase.

8. The driver circuit for the EL element as claimed in claim 7, wherein duration at the holding phase is longer than duration at the sampling phase when the driver circuit for the EL element is during a duty cycle.

9. The driver circuit for the EL element as claimed in claim 8, wherein the EL element is an organic EL element.

10. The driver circuit for the EL element as claimed in claim 9, wherein the first TFT, the second TFT, the third TFT, the fourth TFT, the fifth TFT, and the sixth TFT are all N-type IGZO TFTs.

11. The driver circuit for the EL element as claimed in claim 10, wherein the sixth TFT is a current source at the sampling phase equivalently.

12. The driver circuit for the EL element as claimed in claim 11, wherein a current flowing through the current source is determined by both of the data signal and the first gate signal.

* * * * *